United States Patent
Bates et al.

[11] Patent Number: 5,543,043
[45] Date of Patent: Aug. 6, 1996

[54] CLARIFICATION OF PRODUCED WATER IN THE OIL AND GAS INDUSTRY

[75] Inventors: Jan B. Bates, Lafayette, La.; Steven F. Sciamanna, Moraga, Calif.

[73] Assignee: Chevron U.S.A. Inc., San Francisco, Calif.

[21] Appl. No.: 321,196

[22] Filed: Oct. 11, 1994

Related U.S. Application Data

[63] Continuation-in-part of Ser. No. 46,473, Apr. 13, 1993, abandoned, which is a continuation of Ser. No. 908,690, Jul. 1, 1992, abandoned.

[51] Int. Cl.$^6$ .................................................. B01D 17/035
[52] U.S. Cl. ...................... 210/221.2; 210/109; 210/320; 210/322
[58] Field of Search .................. 210/221.2, 221.1, 210/320, 322, 86, 97, 703, 109, 295; 209/170

[56] References Cited

U.S. PATENT DOCUMENTS

| | | |
|---|---|---|
| 507,774 | 10/1893 | Ball . |
| 1,346,818 | 7/1920 | Gahl . |
| 2,047,989 | 7/1936 | Woelflin . |
| 2,730,190 | 1/1956 | Brown . |
| 2,766,203 | 10/1956 | Brown . |
| 3,479,281 | 11/1969 | Kikindai . |
| 4,800,025 | 1/1989 | Bibaeff . |
| 4,824,579 | 4/1989 | George . |
| 5,158,678 | 10/1992 | Braussard . |

FOREIGN PATENT DOCUMENTS 55-16686  5/1980  Japan .

OTHER PUBLICATIONS

Gutkowski et al, "Flotation of Oil Droplets From Water" Engr. Found. Conference, Fraklin Pierce College, NH Aug. 2–7, 1981.

Reay et al, "Removal of Fine Particles from Water by Dispersed Air Flotation: etc", Canadian Journal of ChE, vol. 51, Apr. 1973.

Warnstedt, "Untersuchungen zur Entölung erdölhalfiger Salzwässer durch feinslasige Begasung", vol. 88, 1972 Erdoel–Erdgas.

Strickland, "Laboratory Results of Cleaning Produced Water by Gas Flotation", Society of Petroleum Engr., Jun. 1980.

*Primary Examiner*—Thomas M. Lithgow
*Attorney, Agent, or Firm*—W. K. Turner; J. S. Reid

[57] ABSTRACT

Apparatus for clarifying produced water. A flotation chamber has a produced water inlet, a clean water outlet, and is segmented into a plurality of cells by baffles. An oil overflow compartment is in fluid communication with the upper portion of the chamber. Produced gas is introduced into each cell of the flotation chamber by porous sparger tubes creating bubbles of 100 to 1000 microns in diameter. The bubbles rise through the water removing any suspended oil particles. The gas exits through a gas outlet. The removed oil collects on the liquid surface of the produced water and overflows to the overflow compartment. Oil is removed from the overflow compartment via an oil outlet.

2 Claims, 5 Drawing Sheets

CLARIFICATION OF PRODUCED WATER IN THE OIL AND GAS INDUSTRY

CROSS REFERENCE TO RELATED APPLICATIONS

This is a continuation-in-part of U.S. application Ser. No. 046,473, filed Apr. 13, 1993, which is a continuation of U.S. application Ser. No. 908,690, filed Jul. 1, 1992, now abandoned.

BACKGROUND OF THE INVENTION

Water produced from crude oil and natural gas production contains varying residual concentrations of crude oil, natural gas condensates and solids. Water and oil mixtures also result from the water washing of refined petroleum fractions following generally known refining processes, as well as from drainage from the various equipment used in such processes. These contaminants must be removed before the water suspension component can be either used in secondary recovery operations or safely discarded.

Small droplets of oil are suspended in the produced water and held there by mechanical, chemical and electrical forces. The amount of oil contained in the untreated produced water in most systems will vary from an average low of about 5.0 ppm to an average high of about 2,000 ppm. In some water systems, oil contents as high as 20,000 ppm (2%) have been observed.

The oil particles in the untreated produced water will usually vary in size from 1 to about 1,000 µm with most of the oil particles ranging between 10 and 100 µm in diameter. Various methods have been suggested for use in removing oil from produced water, including methods based upon gravity separation of lighter oil droplets from the water or gas flotation of the oil droplets. The method and apparatus of the present invention comprise an improvement to the gas flotation technique.

In gas flotation units, large quantities of gas bubbles are injected into the water stream. These bubbles attach to the oil droplets suspended in the stream and cause them to rise to the water's surface as froth. The efficiency of the gas bubble/oil droplet collision increases as the bubble diameter approaches the oil droplet diameter. Therefore, smaller gas bubbles are more effective in removing oil droplets from water, especially for small oil droplets, i.e., droplets less than 10 microns in diameter.

Two distinct types of flotation units are commonly used, which are distinguished by the method employed in producing the gas bubbles needed to contact the water. These are the dissolved-gas units and dispersed-gas units. Dissolved-gas units take a portion of the treated water effluent and saturate the water with a gas, such as natural gas, or air, in a contactor. The higher the pressure the treated water is subjected to, the more gas can be dissolved in the water. Generally, dissolved-gas units utilize a contact pressure of about 20 to 40 psig, with about 20% to 50% of the treated water recirculated for contact with the gas. The gas saturated water is then injected into the flotation chamber where the gas breaks out of solution as small diameter bubbles when the flow enters the lower pressure chamber. In the dispersed-gas units gas bubbles are mechanically dispersed in the total stream either by means of an inductor device or by a vortex set up by mechanical rotors. Most dispersed-gas units contain three or four cells, where bulk water flow moves in series from one cell to the other by underflow baffles.

There are several disadvantages inherent in both the dissolved-gas and dispersed-gas flotation systems. The first is that both systems rely on a recycling of the produced gas, which leads to the gas eventually coming to equilibrium with the water, making it ineffective for use in volatile hydrocarbon stripping. In the dispersed-gas system there is the additional problem associated with the use of high shear pumps or mixers which tend to shear the oil drops into smaller and more difficult to remove droplets. In the dissolved-gas system the bubbles created are very small (i.e., <100 micron). In oil flotation technology, smaller bubbles have more effective collisions with the smaller oil drops. Therefore the small bubbles achieved with the dissolved-gas system is very effective in contacting oil. However, these bubbles are so small as to have two disadvantages. First, they take several minutes to float the oil to the top of the water. Second, their rise velocity is too slow to rise against a downward liquid flow. Thus, they limit the liquid flow rate at which the equipment can process produced water for oil removal. These very small bubbles require more than 10 minutes to rise to the surface in a quiescent tank. In a tank with flow through it the bubble is unable to rise against any downward velocity. We have found in accordance with the present invention that certain sintered spargers are optimally suited specifically to oil flotation in that they produce bubbles in an optimum size range for oil removal from produced water, i.e., bubbles having diameters $\geq 100$ microns and $\leq 1000$ microns, which are smaller than induced flotation bubbles and therefore more effective, faster, and thorough, while remaining large enough to rise to the surface of conventional flotation cells in less than 1 minute even when there is a downward hydraulic flow imposed by the flow through the vessel.

U.S. Pat. No. 2,766,203 (Brown et al) ("the '203 patent") describes a water purification process and apparatus using the dissolved-gas method to introduce gas bubbles into the system. The system described uses a recycle stream of water from the flotation chamber for the injection of the gas. Brown states that only through the partial dissolution of flotation gas in a recycle water stream and subsequent depressuring and dispersion can bubble sizes in the range of $10^{-2}$ to $10^{-4}$ mm (10 to 0.1 Micron) and 0.5 to 5 mm (500 to 5000 microns) be obtained, and efficient results obtained.

The use of sparging tubes in solid/liquid separation systems is known, as for example in U.S. Pat. No. 5,122,261 (Hollingsworth), which discloses the use of sintered metal tubes to introduce air into mineral pulp flotation columns. That patent also describes plugging that is anticipated with the use of sintered sparging tubes in pulp flotation.

Typical dispersed gas flotation systems have complex internal components, such as in U.S. Pat. No. 5,158,678 (Broussard), which are necessary to introduce and/or disperse the gas bubbles into the system. Further, these systems require additional external apparatus for secondary separation and recycle of the gas, oil, and water streams, as shown in the '203 patent.

It is therefore an object of the present invention to provide a means for purifying produced water which does not rely on high shear pumps, mixers, or gas saturated water to produce gas bubbles, and which reduces the number of components required for the flotation.

It is a further object of this invention to develop a system for generating optimally sized diameter gas bubbles in which the produced gas is not recycled through the system and in which contact times of about 1 minute/cell are adequate for the gas to rise to the surface and disengage from the liquid.

It is an advantage of the present invention that the gas induced into the system is used only once, and then recovered for alternative use.

It is also an advantage of the present invention that recycle loops for removed water, oil, and gas are not required. It is a further advantage that the sparger system can be applied to existing systems by adding sparger tubes to the existing system to generate bubbles, thereby allowing the existing mechanical bubble generation system to be removed or shut down.

SUMMARY OF THE INVENTION

Briefly, the present invention comprises an improved produced water purification method and apparatus for clarifying produced water through the use of field available gas generated from generally known oil production operations. The invention utilizes a flotation chamber having a plurality of cells for separating water and oil, an oily water feed inlet at a first end, a floated oil overflow compartment having an oil outlet, a clean water outlet at said second end, and a series of gas sparging tubes for introducing flotation gas into the cells of the flotation chamber. Field available natural gas, a normal byproduct of the oil production operation, is captured from the field and a slip stream of the gas production stream is temporarily diverted to the flotation chamber by the sparger tubes of a porous medium of predetermined size located in the cells of the flotation chamber. As the diverted produced gas passes through the porous sparger material gas bubbles having a diameter from about 100 to 1000 μm are produced.

The bubbles, having a larger overall diameter as compared to the suspended oil particles, and therefore a faster rise rate, quickly migrate through and attach themselves to the suspended oil droplets, causing them to rise to the top of flotation chamber where the floated oil overflows into an overflow compartment. The temporarily diverted produced gas used to generate the gas bubbles for the clarification is then recaptured from the top of the flotation chamber and returned for general commercial processing.

Because of the simple design of the produced water clarification system over prior designs, the cost to build, install, and operate the produced water clarification system is lower than the cost of the prior art. Further, due to the mechanical simplicity of the present invention, there is less likelihood of mechanical failure of such systems as recycle pumps, gas recovery compressors, secondary separation equipment, and the like. The reduced likelihood of mechanical failures results in a higher operating factor, eliminates the need for back-up components, and reduces the chances that an oil well will need to be shut-in due to failure of surface equipment. The optimally sized sparger bubbles can be used to provide faster, more complete flotation or they can provide the same rate and removal but with chemical saving costs because some of the chemicals used in induced flotation are no longer required with the system described herein.

BRIEF DESCRIPTION OF THE DRAWINGS

In order to assist the understanding of this invention reference will now be made to the appended drawings which are exemplary only, and should not be construed as limiting the invention.

DETAILED DESCRIPTION OF THE INVENTION

Figure 1:
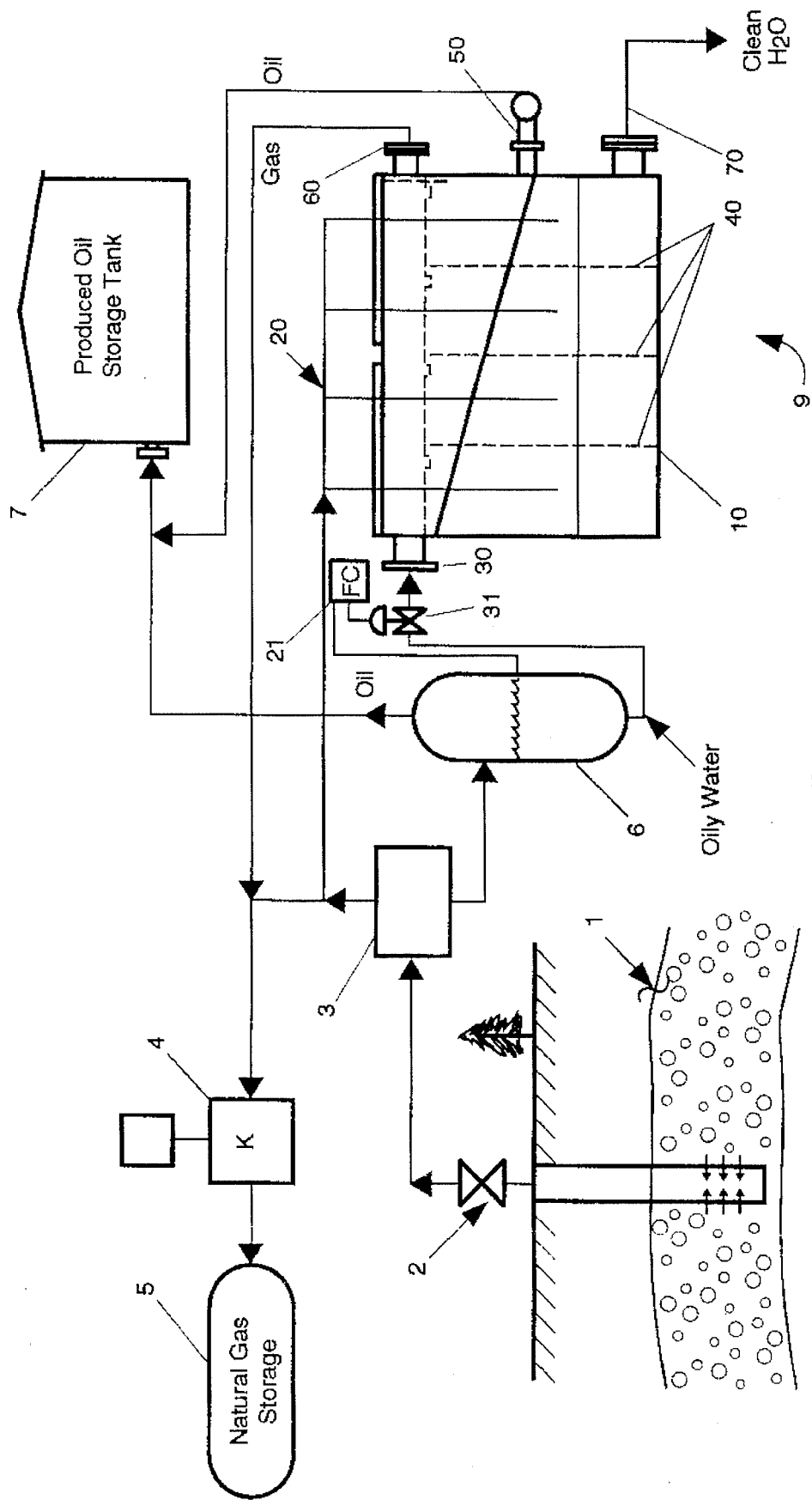
FIG. 1 shows a schematic of the produced water gas flotation clarification apparatus as installed in the field.

The present invention involves a simple and unique method and apparatus for clarifying produced water. Referring to FIG. 1, the apparatus of the present invention 9, which will be described herein as either a "produced water gas flotation clarification system" or simply, a "produced water clarification system" is shown as installed in the field. Oil, water, and natural gas, collectively known as "production fluids", are produced from a subterranean reservoir, 1, which can be either on-shore or off-shore. The production fluids pass through a wellhead, 2, and into a primary separator, 3, where the liquid and gas components of the production fluids are separated primarily by gravity. Oil and water flow from the bottom of the liquid/gas separator into a secondary separator for oil/water separation, 6, where the oil and water are separated by gravity. Oil from the oil/water separator flows to the produced oil storage tank, 7. Oily water from the oil/water separator flows from the bottom of that separator into the produced water clarification apparatus, shown generally as item 9. Produced natural gas flows from the liquid/gas separator 3 to a gas compressor, 4, and then to the natural gas storage vessel, 5. Although primarily natural gas, the produced gas stream may contain traces of other gasses such as H2S, and so the expression "produced gas" will be used rather than "natural gas" to indicate that processed, purified natural gas is not required to practice the method of the instant invention. A slip stream of the produced gas, taken before the gas enters the compressor, is routed to the produced water clarification system via the produced gas injection system, 20. A liquid flow control system 21 of a type well known in production processing monitors the liquid level in the secondary separator, 6, and controls the produced water feed flow rate to flotation chamber, 10 via flow control valve 31.

Figure 2:
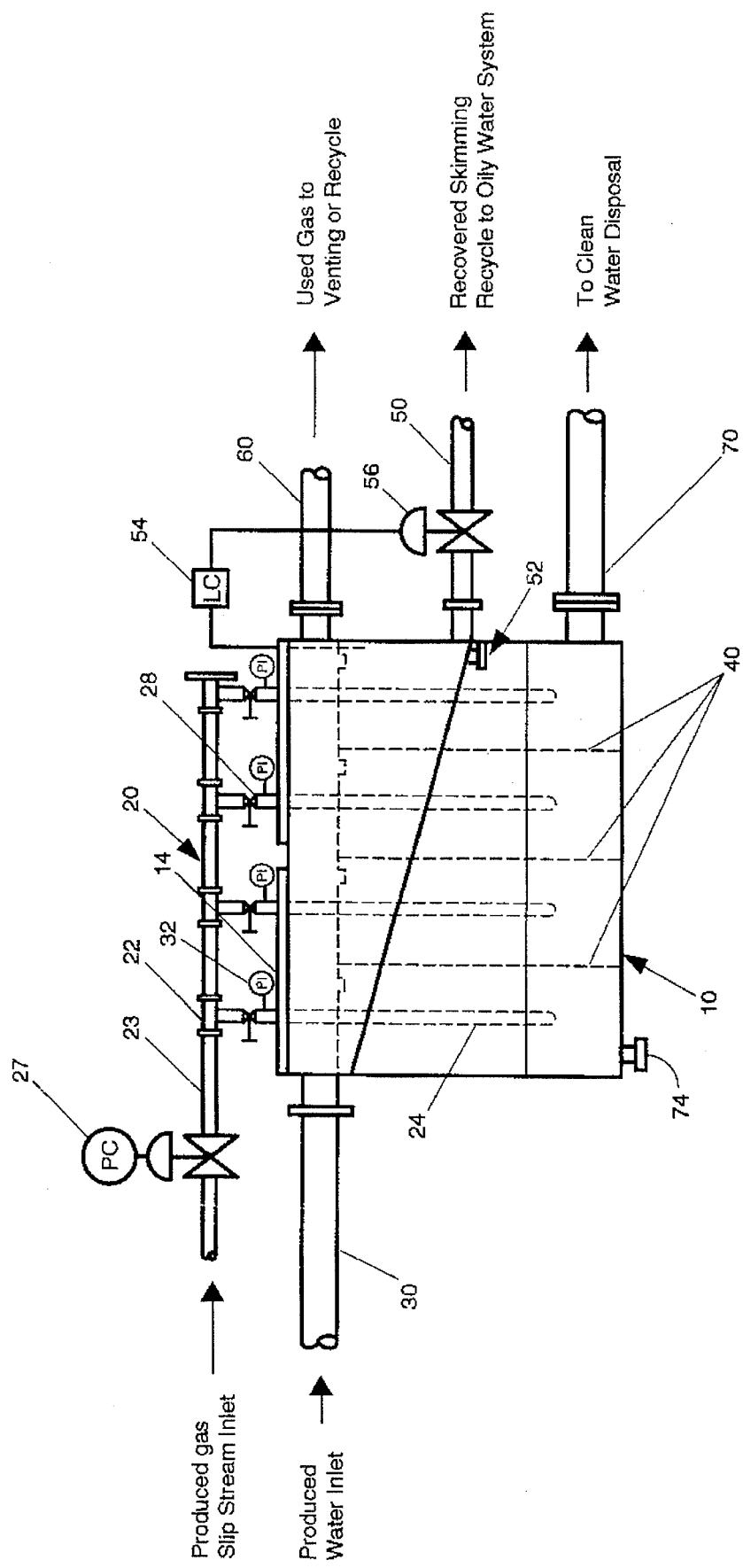
FIG. 2 shows a side elevation detail of the produced water gas flotation clarification apparatus used to practice the method of the present invention.

FIG. 2 shows the processed water clarification system in more detail. The flotation chamber 10 is divided into four cells of equal length by baffles 40. Each baffle 40 is a solid sheet fitting tightly to the bottoms and sides of the flotation chamber. The baffles have openings on either side (as shown in detail in FIGS. 4 and 5 at 45) which allow the produced water to pass from one end of the flotation chamber to the other. The tops of the baffles 40 are even with the edge of the overflow compartment, described more fully below. Any liquids above the tops of the baffles will thusly flow into the overflow compartment, shown as 12 in FIGS. 4 and 5. The flotation chamber 10 typically has tapered lower panels 11 which assist in draining and cleaning the vessel through drains 74.

Produced water enters the flotation chamber 10 via the produced water inlet, 30. As the produced water passes from one cell to the next via openings (shown at 45 in FIGS. 4 and 5) in the baffles, it is contacted by produced gas injected through the sparger tubes, 26, as more fully described below. The natural gas removes oil from the produced water so that only clean water exits the flotation chamber via the clean water outlet, 70.

Figure 3:
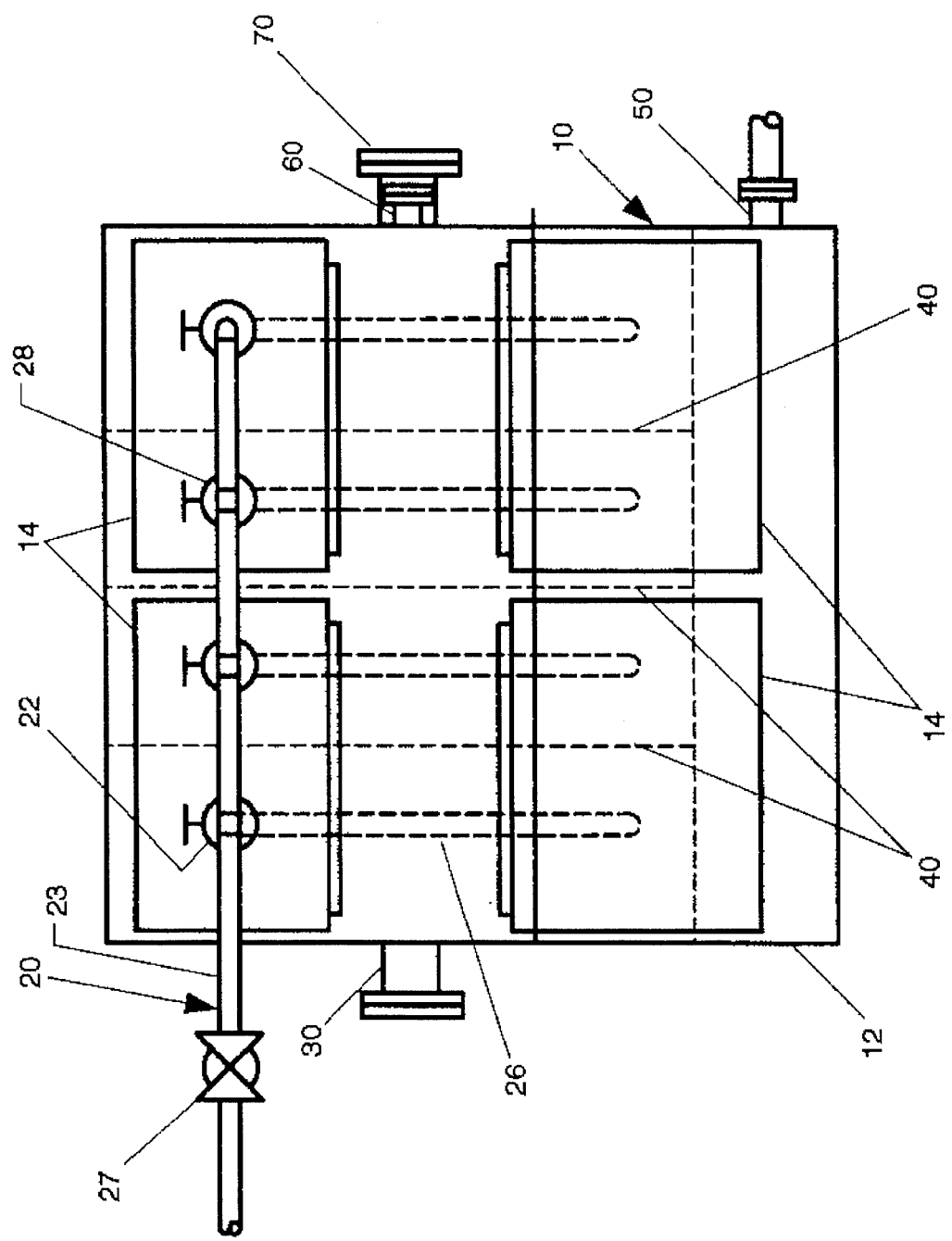
FIG. 3 shows a plan view detail of the produced water gas flotation clarification apparatus used to practice the method of the present invention.
Figure 4:
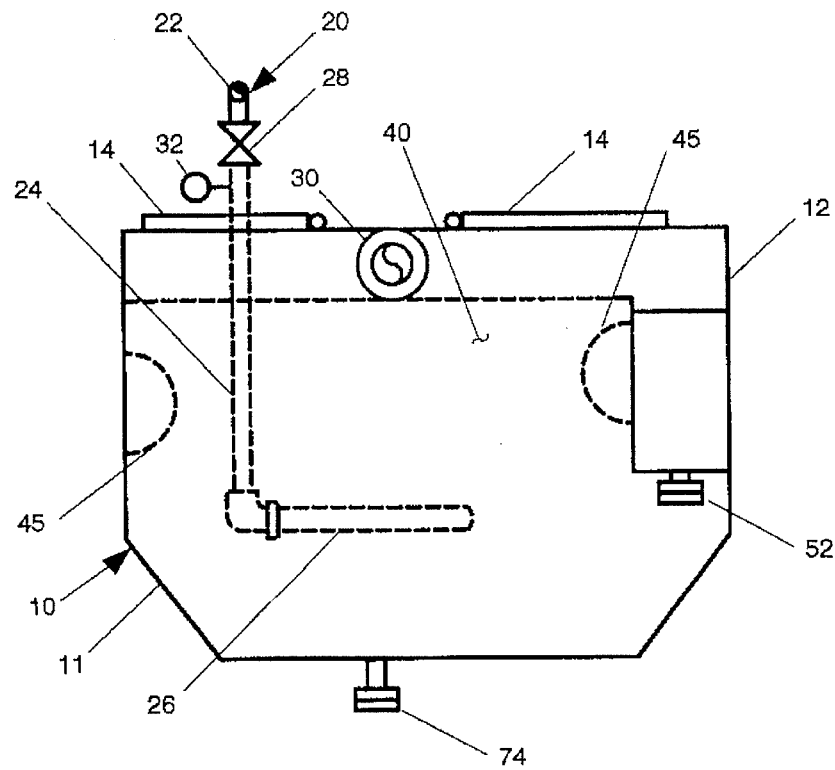
FIG. 4 shows a left elevation detail of the apparatus shown in FIG. 2.

Field available produced gas, which is used to float the oil from the produced water, is distributed to the cells of the flotation chamber via the produced gas injection system, 20. Produced gas passes through gas control valve 27, a pressure control means for letting down the pressure of the field gas to a pressure safe for the flotation chamber's internal pressure rating. The produced gas branches to the various cells via a gas supply line, 23, and piping tees, 22, and enters the cell though sparger feed tubes 24. The sparger feed tubes are connected to the sparger tubes, 26. The sparger tubes are arranged so as to uniformly distribute the gas over the horizontal plane area in the cell in which they inject gas. FIGS. 3 and 4 show the location of the sparger tubes in the cells. The sparger tubes are a porous material, either a sintered metal, a sintered ceramic, or a sintered plastic tube. The sparger tube has a pore size less than 10 microns in diameter, preferably in the range of about 0.5 to 5 µm, and more preferably about 2 µm to generate gas bubbles having an approximate diameter in the range of about 100 µm to about 1000 µm and preferably about 500 µm. Each sparger tube can be isolated from the other sparger tubes by a sparger tube isolation valve, 28. Should a sparger tube become plugged from scale buildup, as would be indicated by pressure indicator 32, the tube may be isolated via valve 28 and accessed via the access covers, 14 in FIG. 3. In this way the water clarification system can be run continuously and does not need to be taken out of service to clean the sparger tubes.

Figure 5:
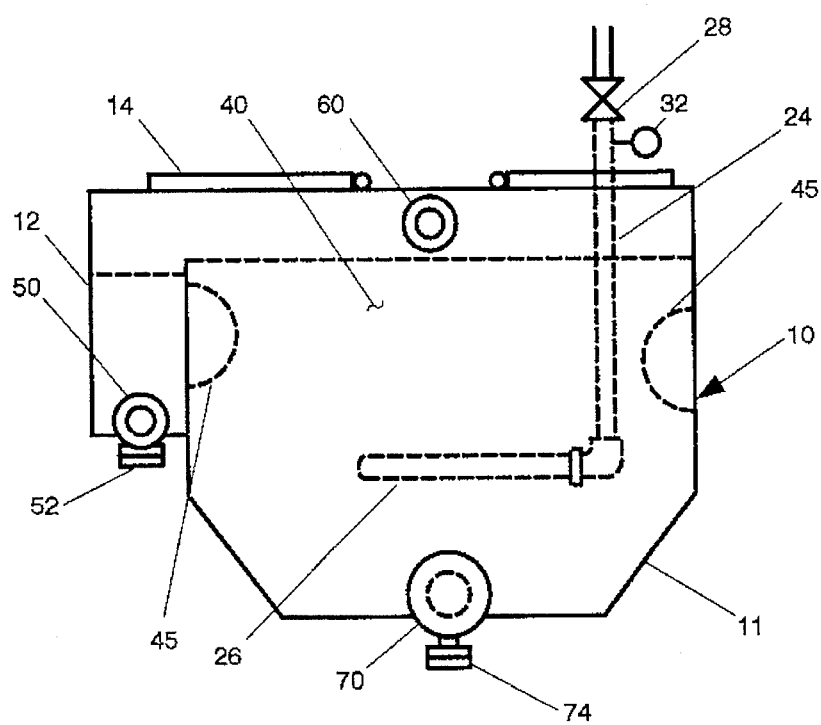
FIG. 5 shows a right elevation detail of the apparatus shown in FIG. 2.

As the sparged produced gas is introduced into the flotation chamber, the bubbles rise vertically, contacting the swirling, generally cross-flowing produced water. As the bubbles rise they contact oil particles in the produced water. Through a combination of adhesion and buoyancy, the bubbles sweep the oil from the water, carrying the oil upward in their natural flow to the surface. Once on the surface, the bubble "pops" due to the equalization in pressure between the bubble and the pressure within the top portion of the flotation chamber, releasing the oil. The gas is then carrier out the flotation chamber via gas outlet 60, is compressed and sent to storage or is flared, as in some offshore operations. By this process the diverted gas is used only once rather than recycled, thereby ensuring that the injected gas does not become saturated. The released oil forms a film of oil on top of the liquid level of produced water. With reference to FIG. 5, when the top of the oil level rises above the top of the baffle 40, the oil overflows into the overflow compartment, 12. Oil which accumulates in the overflow compartment is removed via oil outlet 50 and is sent to oil storage. The overflow compartment is fitted with a clean-out, 52, for maintenance.

We have found that a produced gas volume of about 1 to 10, and more preferably about 3, cubic feet of produced gas per barrel of produced water produces optimum results with the sparger tubes indicated. Spargers should be sized to produce gas face velocities (i.e., cubic feet of introduced gas per square foot of porous sparger surface) of less than 10 ft3/ft2, and preferably about 2 ft3/ft2.

As shown in FIG. 2, the overflow compartment 12 can be fitted with a level control device 54 which regulates the level of accumulated oil in the compartment. When the oil level reaches a predetermined height, the level control device actuates an oil outlet valve 56 on the oil outlet line 50, allowing the oil to flow out of the overflow compartment. The level control device may also be used to actuate a pump, not shown, to pump away the accumulated oil.

In another embodiment wherein the apparatus of the present invention is used to remove undesirable dissolved gas from a liquid stream, the overflow compartment 12 as shown in FIG. 4 may be omitted without affecting operation of the apparatus. The injected gas, which strips the undesired dissolved gas from the liquid stream, is removed from the flotation chamber and discarded or further processed. An example of an application of this embodiment would be stripping $CO_2$ from water to reduce the corrosive nature of the solution.

Figure 6:
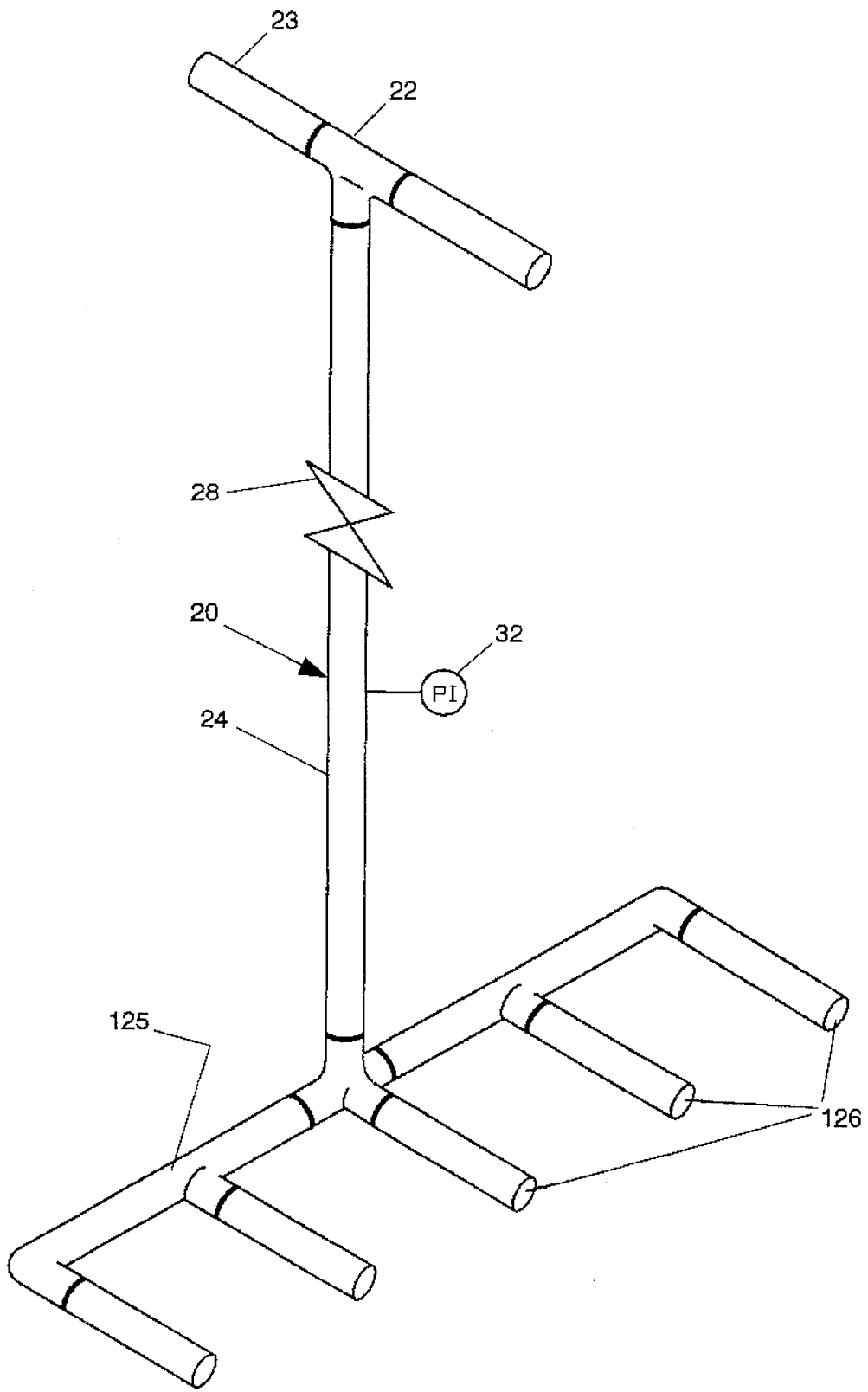
FIG. 6 shows a detail of an alternate embodiment of the sparger tube array used in the present invention.

FIG. 6 shows an alternate configuration for the sparger tubes 26 of FIG. 4. In FIG. 6, the sparger feed tube 24 is connected to a secondary sparger manifold, 125, which in turn is connected to a plurality of sparger tubes, 126. This arrangement increases the surface area of sparger tubes in the flotation chamber. A third sparger tube arrangement, not shown, is to run a single sparger tube the length of the flotation chamber through holes in the baffles 40.

With reference to FIG. 2, flow of produced gas to the produced water purification system can be regulated by valve 27, to control the total gas surface area generated per unit time within the vessel. For example, for a sparger tube surface having a preferred porosity of 2 µm, for every scfm of gas flowing through such a surface in liquid contact, $6.76 \times 10^9$ bubbles of 200 micron volume mean diameter are generated for a total gas surface area of 9144 $ft^2$/scfm.

In one embodiment of the method of the present invention, an oil flotation system of the type described by Brown, et al in U.S. Pat. No. 2,766,203 ("the '203 patent") is retrofitted to construct the improved oil flotation device of the present invention. Specifically, with reference to FIG. 1 in the '203 patent, the following external equipment is not required: the two water recycle pumps 74 and 184, the contactor 128, the secondary oil-water flotation chamber 154, the flotation gas compressor 84 is not required when field-available gas pressure is sufficient, and the gas recycle loop 80. Further, when the internal components of the flotation chamber 200 of Brown resemble those of the flotation chamber described by Broussard in U.S. Pat. No. 5,158,678 ("the '678 patent"), the following internal components may be eliminated and replaced with sparger tubes: with reference to FIG. 2 of the '678 patent, the eductors 54, the L-shaped baffles 48, and the inlet piping 32.

EXAMPLE

To illustrate the sparging mechanism of the present method the following example is provided to merely demonstrate the advantages of the present invention and not in any way act as a limitation.

An existing flotation cell at Chevron East Cameron 272-A was retrofit with spargers tubes and demonstrated improved performance. The unit was a 4000 Bbl/day four cell hydraulic flotation machine with dimensions of approximately 14 ft long×6 ft high×6 ft wide. The unit was producing oil and grease numbers, as measured by the freon extraction infra red detection method, in the 10–50 (average 32) PPM range. The system was then retrofitted with a single 2 inch diameter×6 ft long sparger tube made of sintered stainless steel porous gas pipe. This pipe was installed from the feed end, penetrating each of the four cells. The preexisting gasification system, including pump and spargers, was turned off. The sparger gas feed rate was 3 cubic feet of produced gas per bbl of water. The oil/grease numbers, measured by method described above, dropped to an average of 22. Maintenance and chemical usage was also reduced with a resulting 60% reduction in operating costs. Similar retrofits were also made to other units with successful results (concentrations below 29 PPM of oil and grease). However, prior performance of those units is unknown. The installations were as follows:

At East Cameron 272-C, a 4000 BWPD (barrels of water per day) Chemlink hydraulic machine was retrofitted with one 2 inch×7 ft×2 micron porosity sparger;

At East Cameron 272-D/E, a 26,000 BWPD Chemlink hydraulic machine was retrofitted with ten one inch×5 ft×2 micron porosity spargers, two tubes/cell in each of five cells.

At East Cameron 272-H a 4000 BWPD Chemlink machine was retrofitted with one 2 inch×7 ft×2 micron porosity sparger tube.

While the present invention has been described with reference to specific embodiments, this application is intended to cover those various changes and substitutions that may be made by those skilled in the art without departing from the spirit and scope of the appended claims.

What is claimed is:

1. An apparatus for removing oil from produced water, comprising:

(a) a flotation chamber having a first end, a second end, a bottom, a top, and sides, the interior of said chamber being segmented into a plurality of cells by essentially vertical baffles, there being a space between the top of said baffles and the top of said chamber, said baffles further having openings to permit fluid communication between adjacent cells;

(b) a produced water inlet disposed within said first end;

(c) a clean water outlet disposed within a lower portion of said second end;

(d) a gas outlet disposed within the top;

(e) an overflow compartment in fluid communication with the space between said top of said chamber and the tops of said baffles and having an oil outlet disposed therein;

(f) a produced gas injection means for injecting gas into the lower portion of said cells, said gas injection means comprises porous sparger tubes through which said gas is injected, said sparger tubes having a mean pore diameter of approximately two microns; and (g) a control means which regulates the level of accumulated oil in said compartment, said control means connected to means for discharging the accumulated oil when said accumulated oil reaches a predetermined height.

2. An apparatus for removing oil from produced water, comprising:

(a) a flotation chamber having a first end, a second end, a bottom, a top, and sides, the interior of said chamber being segmented into a plurality of cells by essentially vertical baffles, there being a space between the top of said baffles and the top of said chamber, said baffles further having openings to permit fluid communication between adjacent cells;

(b) a produced water inlet disposed within said first end;

(c) a clean water outlet disposed within a lower portion of said second end;

(d) a gas outlet disposed within the top;

(e) an overflow compartment in fluid communication with the space between said top of said chamber and the tops of said baffles and having an oil outlet disposed therein;

(f) a produced gas injection means for injecting gas into the lower portion of said cells, said gas injection comprises porous sparger tubes through which said gas is injected, said sparger tubes having a mean pore diameter of approximately two microns; and (g) a control means for controlling the pressure of gas injected into said cells.

* * * * *